US008863691B2

(12) United States Patent
Colvin et al.

(10) Patent No.: US 8,863,691 B2
(45) Date of Patent: Oct. 21, 2014

(54) NECTAR FEEDER WITH FLOAT AND VALVE

(71) Applicant: Aspects, Inc., Warren, RI (US)

(72) Inventors: Barry D. Colvin, Hope, RI (US); David Guay, Seekonk, MA (US); Rolf Richter, East Greenwich, RI (US)

(73) Assignee: Aspects, Inc., Warren, RI (US)

( * ) Notice: Subject to any disclaimer, the term of this patent is extended or adjusted under 35 U.S.C. 154(b) by 182 days.

(21) Appl. No.: 13/658,946

(22) Filed: Oct. 24, 2012

(65) Prior Publication Data

US 2013/0042815 A1 Feb. 21, 2013

Related U.S. Application Data

(63) Continuation of application No. 13/069,142, filed on Mar. 22, 2011, which is a continuation of application No. 12/102,638, filed on Apr. 14, 2008, now Pat. No. 7,946,249.

(60) Provisional application No. 60/911,941, filed on Apr. 16, 2007.

(51) Int. Cl.
*A01K 39/024* (2006.01)
(52) U.S. Cl.
USPC ................................. 119/78; 119/77; 119/74
(58) Field of Classification Search
USPC ................................. 119/78, 77, 79, 80, 74, 72
See application file for complete search history.

(56) References Cited

U.S. PATENT DOCUMENTS

| 1,062,537 | A | 5/1913 | Culbertson |
| 1,120,940 | A | 12/1914 | Jolley |
| 1,372,371 | A | 3/1921 | Ross |
| 1,530,657 | A | 3/1925 | Eummelen |
| 1,815,964 | A | 7/1931 | Boyer |
| 1,828,048 | A | 10/1931 | Jevons |
| 1,928,103 | A | 9/1933 | Hill |
| 2,097,719 | A | 11/1937 | Brembeck |
| 2,618,237 | A | 11/1952 | McDermott et al. |
| 2,623,500 | A | 12/1952 | Riley et al. |
| 2,696,803 | A | 12/1954 | Deffenbaugh |
| 3,016,044 | A | 1/1962 | Sollars |
| 3,405,686 | A | 10/1968 | Hart |
| 3,450,103 | A | 6/1969 | Davis |
| 3,543,729 | A | 12/1970 | Davis |
| 3,712,267 | A | 1/1973 | Moliterni |
| 3,714,929 | A | 2/1973 | Boterweg |
| 3,861,358 | A | 1/1975 | Bowell |
| 4,180,015 | A | 12/1979 | Dawson, Jr. |

(Continued)

FOREIGN PATENT DOCUMENTS

GB 2167638 A 6/1986

OTHER PUBLICATIONS

HoHummers-Quality Hummingbird Feeders for the Ho-Hum Lifestyle, http://www.rv-dreams.com/bird-feeders.html.

*Primary Examiner* — Yvonne Abbott
(74) *Attorney, Agent, or Firm* — Barlow, Josephs & Holmes, Ltd.

(57) ABSTRACT

The present invention is a nectar feeder for birds. The nectar feeder has a container for storing nectar feed. A base tray is connected in fluid communication with the container. A float is positioned between the container and the base tray. In operation, the nectar feed flows through the container and into the base tray until the float rises to a level to prevent fluid from flowing into the base tray.

17 Claims, 9 Drawing Sheets

(56) References Cited

U.S. PATENT DOCUMENTS

| | | |
|---|---|---|
| 5,303,674 A | 4/1994 | Hyde, Jr. |
| 5,682,835 A | 11/1997 | Walter et al. |
| 5,829,386 A | 11/1998 | Wenstrand |
| 5,924,382 A | 7/1999 | Shumaker |
| 6,192,916 B1 | 2/2001 | Antunez, Jr. et al. |
| 7,000,566 B2 | 2/2006 | Fort, II |
| 7,007,634 B1 | 3/2006 | Pederson |
| 7,231,890 B2 | 6/2007 | Colvin |
| 7,234,418 B2 | 6/2007 | Fort, II et al. |
| 7,946,249 B2 | 5/2011 | Colvin et al. |
| 2007/0221133 A1 | 9/2007 | Richmond |
| 2007/0289540 A1 | 12/2007 | Stone et al. |
| 2008/0251025 A1 | 10/2008 | Guay et al. |
| 2010/0224132 A1 | 9/2010 | Gauker et al. |
| 2011/0297095 A1 | 12/2011 | Cruz et al. |

# NECTAR FEEDER WITH FLOAT AND VALVE

CROSS REFERENCE TO RELATED APPLICATION

This application is related to and claims priority from earlier filed U.S. non-provisional patent application Ser. No. 13/069,142 filed Mar. 22, 2011, U.S. non-provisional patent application Ser. No. 12/102,638 filed Apr. 14, 2008 now U.S. Pat. No. 7,946,249, and provisional patent application Ser. No. 60/911,941, filed Apr. 16, 2007, which are all hereby incorporated herein by reference.

BACKGROUND OF THE INVENTION

The present invention relates to bottle type bird feeders, namely nectar feeders for birds. The nectar feeder of the present invention contains a float and a valve which together regulates the flow of nectar feed from a container and into a base tray. The float and valve either prevent or allow the flow of nectar feed depending upon the volume of nectar feed contained in the base tray.

In the prior art, typical hummingbird feeders include an enclosed base tray for housing the liquid feed nectar therein. A number of feed ports are provided through the top base cover of the base tray so a bird may gain access to the liquid feed therethrough. Typically, the feed ports are small in diameter to simulate an actual flower in the field.

There is a periodic need to re-fill the base tray of the feeder with the liquid feed when the supply is low or completely out. In the prior art, an inverted vacuum-type bottle is commonly employed to supply the liquid into the main chamber of the base tray of the feeder to provide a continuous supply of feed for consumption by the hummingbirds. In the prior art, a bottle, in similar configuration and size to a baby bottle is typically used. However, larger or smaller bottles may be used. The bottle has a bottom closed end and a top open end which has male threading thereon. A complementary female threaded aperture is provided in the top base cover of the base tray of the feeder to receive the open threaded end of the reservoir. The reservoir, with liquid feed therein, supplies liquid into the base tray of the feed for access by the hummingbirds. Since the bottle has a closed top end, a vacuum is created thus controlling the downward flow of liquid as the hummingbird feeds from the feeder. As liquid is drained from the reservoir, bubbles will rise in similar fashion to a common drinking water bubbler.

Due to presence of high sugar content in hummingbird nectar, which results in accumulation of solids and growth of mold inside the bottle and base tray, cleaning of the prior art feeder must be frequent to maintain a desirable level of performance. Such frequent cleaning is considered by many users to be difficult for several reasons. For example, the users must use a variety of brushes that can fit into the small mouth of the bottle to clean the interior. Cleaning the prior art bottle feeders using a rag or sponge is generally impractical.

In this prior art construction, the base tray of the feeder must be inverted, when threadably receiving the bottle that contains the new supply of liquid feed, to avoid spilling of the liquid. If the base tray of the feeder is not inverted, the liquid will spill until the bottle was threadably secured to the top base cover of the base tray of the feeder. Inverting the base tray portion of feeder is undesirable because any remaining liquid feed still in the base tray will leak out making the installation of the bottle messy. This is particularly messy if a substantial amount of liquid feed remains in the base tray of the feeder.

Accordingly, there is a need for a nectar feeder that provides a mechanism for providing nectar feed without inverting a bottle or the base tray of the feeder. There also remains a need for a nectar feeder that provides access for easy refilling of the nectar feeder without spilling the nectar. Also, there remains a need for a nectar feeder that is easy to clean. There is a further need to better control the flow and delivery of nectar.

BRIEF SUMMARY OF THE INVENTION

An embodiment of the present invention preserves the advantages of prior art bottle type nectar feeders. In addition, it provides new advantages not found in currently bottle type nectar feeders and overcomes many disadvantages of such currently available type nectar feeders.

The embodiment is generally directed to a novel and unique nectar feeder. The nectar feeder of the present invention contains a float and a valve which together regulates the flow of nectar feed from a container and into a base tray. The float and valve either prevent or allow the flow of nectar feed depending upon the volume of nectar feed contained in the base tray.

The nectar feeder contains a base tray, container, and a float. The container for holding nectar feed has a top end and a bottom end. The bottom end of the container defines an exit port, which is tapered, for nectar feed to exit the container. A cap is threadably attached to the top end of the container. A lid is hingedly connected to the cap on the top end. A hanger is also attached to the cap for securing the nectar feeder to a stationary object. Optionally, the feeder may be post-mounted.

The container has a lower periphery with at least one thread on an outside surface. In one embodiment, the lower periphery has two partial threads on the outside surface of the container. The threads on the container are used to threadably engage the container to the base tray.

A base tray contains at least one vertical member extending upwardly from the base tray. In a preferred embodiment, the base tray contains two vertical members which are mirror images of one another. The vertical members have a top, middle, and bottom portion. The bottom portion is attached to a top surface of the base tray. The middle portion defines a seat for receiving a portion of the bottom end of the container. For example, one vertical member may provide a seat along less then 180 degrees of the circumference of the bottom end of the container.

The top portion of the vertical member contains a thread for threadably engaging the thread on the lower periphery of the container. In a preferred embodiment, the vertical members each contain a partial thread that cooperate together to provide female threading to receive the male threading on the container. In operation, the lower periphery of the container threadably engages the top portion of the vertical members. While at the same time, the bottom end of the container is seated within the respective vertical members for support.

A base cover is attached to the base tray. The base cover defines a base cover hole for receiving the container. The inner periphery of the base cover hole contains a thread for threadably engaging a thread on the lower periphery of the container. In a preferred embodiment, the base cover and the vertical members threadably engage with a separate thread on the lower periphery of the container. The upper surface of the base cover defines at least one feed port and has a raised edge on the upper surface.

A float is positioned between the bottom end of the container and the base tray. In a preferred embodiment, the float has a thickness less than the depth of the base tray and a height less than the height of the vertical member.

The float contains a ball seated on a central portion of the float. The ball is respectively positioned below the exit port on the bottom end of the container. The float defines a float hole for slidably engaging the vertical member when the base tray is filled with nectar feed.

In operation, a user opens the lid and fills the container with nectar feed. The nectar feed flows through the exit port and into the base tray. As the base tray fills with nectar feed, the float rises. When the ball seated on the float sealingly engages the exit port, the nectar feed stops flowing into the base tray. When the nectar feed is consumed by the birds through the feeding ports, the nectar feed level in the base tray drops. As a result, the float disengages the ball from the exit port to once again allow the flow of nectar feed to fill the base tray.

It is therefore an object of the present invention to provide a nectar feeder having a float and valve for regulating a flow of nectar from the container and into the base tray from where the birds can retrieve the nectar feed.

It is a further object of the embodiment to provide a nectar feeder which can be filled without inverting the base tray or the container.

Another object of the embodiment is to provide a nectar feeder that is easier to clean than prior art nectar feeders.

Other objects, features and advantages of the invention shall become apparent as the description thereof proceeds when considered in connection with the accompanying illustrative drawings.

Another object is to provide a nectar feeder with a keyed float valve for precise control of the flow of nectar.

BRIEF DESCRIPTION OF THE DRAWINGS

The novel features which are characteristic of the nectar feeder are set forth in the appended claims. However, the nectar feeder, together with further embodiments and attendant advantages, will be best understood by reference to the following detailed description taken in connection with the accompanying drawings in which:

DETAILED DESCRIPTION OF THE PREFERRED EMBODIMENTS

Figure 1:
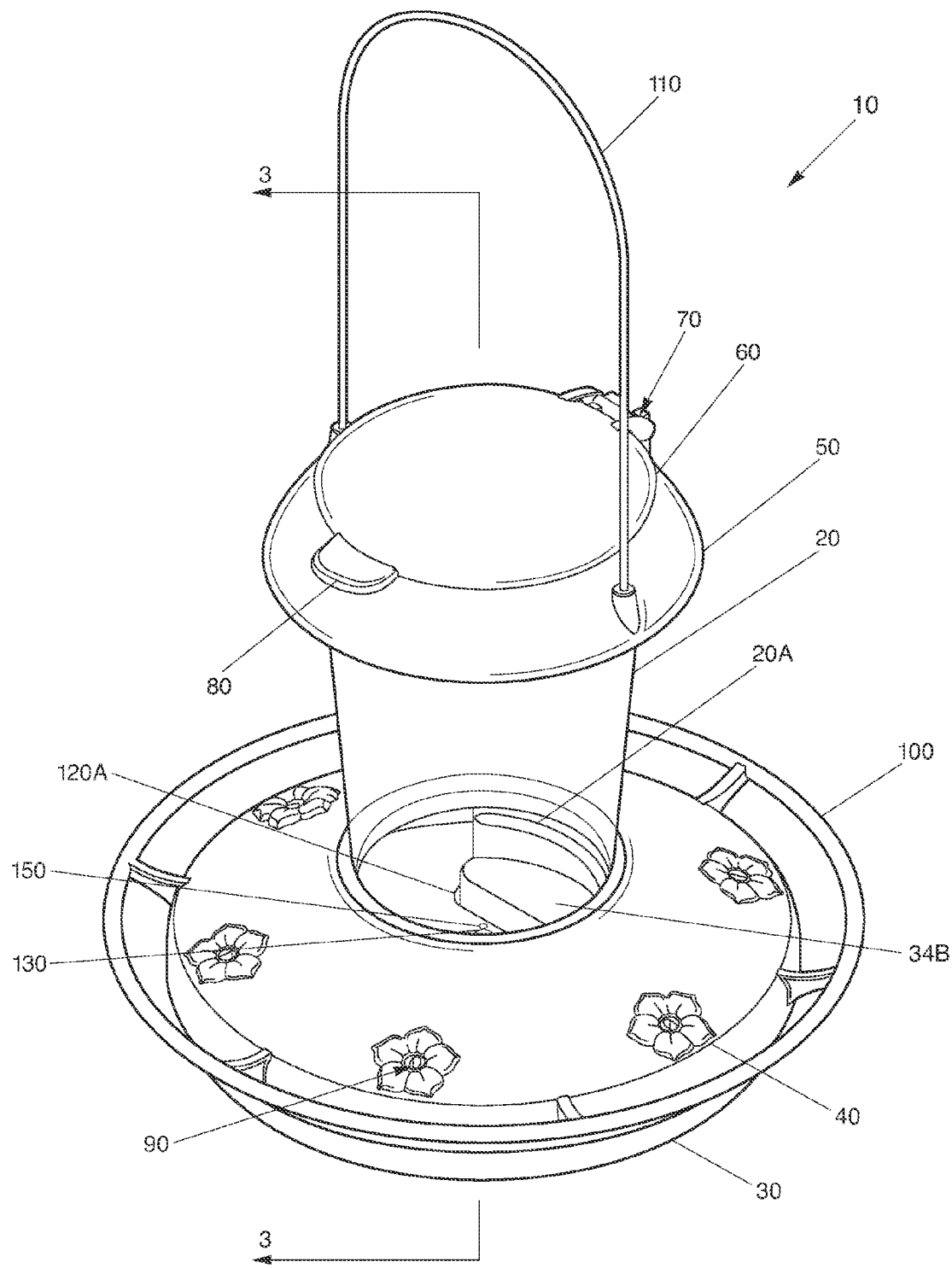
FIG. 1 is a perspective view of the bird feeder in accordance with the present invention.

The present invention is a nectar feeder 10 as shown in FIGS. 1-9. The nectar feeder 10 contains a float 120 and a ball 130 which together regulate the flow of nectar feed 160 a container 20 and into a base tray 30. The float 120 and ball 130 either prevent or allow the flow of nectar feed 160 depending upon the volume of nectar feed 160 contained in the base tray 30. Moreover, the nectar feeder 10 allows the nectar feed 160 to be poured directly into the container 20 of the feeder 10 which obviates the need to detach the container 20 each time the feeder 10 needs to be refilled. This avoids the mess associated with refilling nectar feeders of the prior art.

Figure 2:
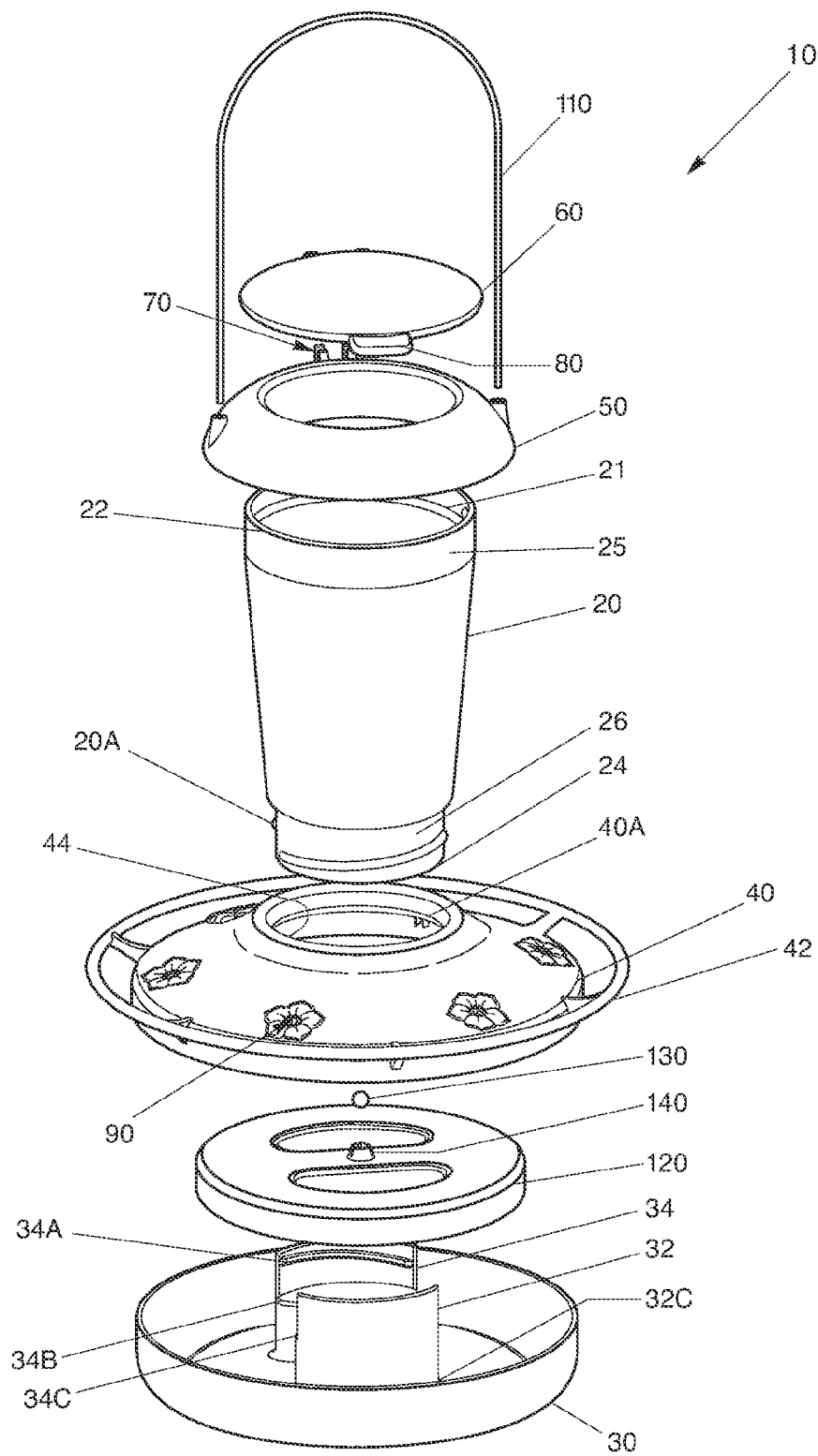
FIG. 2 is an exploded view of the bird feeder of FIG. 1.

Referring to FIG. 1, the nectar feeder 10 of the present invention is shown. An exploded view of the present invention of FIG. 1 is shown in FIG. 2. The nectar feeder 10 includes a container 20 for storing nectar feed 160, the base tray 30 and the float 120 containing the ball 130. The container 20 is attached to the base tray 30 and is in fluid communication with the base tray 30. The float 120 containing the ball 130 is positioned between the 20 and the base tray 30. When the nectar feed 160 flows through the container 20 and into the base tray 30, the float 120 rises until the ball 130 prevents nectar feed 160 from flowing through the container 20 and into the base tray 30. By having the float 120 and ball 130 regulate the flow of nectar feed 160, the nectar feeder 10 requires less maintenance, reduced spillage of nectar feed 160, and self-regulation of the nectar feed 160. Details of the ball 130 construction is discussed in detail below.

Referring to FIG. 2, the container 20 has a top end 22 and a bottom end 24 in which both ends of the container 20 have at least one thread (21, 20A, 20B) positioned thereupon in different locations. The container 20 has a volume sufficient to hold enough nectar feed 160 to fill the base tray 30 and, as a result, allow the float 120 to rise. In one embodiment, the container 20 defines a shape of a bottle. However, it should be noted that the container 20 may define shapes other than a bottle type shape. It should also be noted that a design or shape other than a bottle may be used for the present invention.

The bottom end 24 of the container 20 is partially closed off and it defines at least one exit port 150 (FIG. 6), which may be tapered, for nectar feed 160 to exit the container 20 into the base tray 30. In a preferred embodiment, there is one exit port 150 but alternative embodiments may contain two or more exit ports 150. It should be noted that the size of the exit port 150 may be adjusted according to the viscosity of the liquid and the desired flow rate of the nectar feed 160 from the container 20 to the base tray 30.

The container 20 is removably attached to the base tray 30. In a preferred embodiment, the container is threadably attached to the base tray 30. More importantly, the container 20 is attached without first inverting the container 20 or the base tray 30. The benefit is that the container 20 maintains an upright or vertical position during refilling which is easier and prevents spillage of nectar feed 160. It should be noted that alternative methods known in the art for attaching the container 20 to the base tray 30 are also suitable. For example, the container 20 may be fixedly attached to the base tray 30 without the use of threads.

Figure 3:
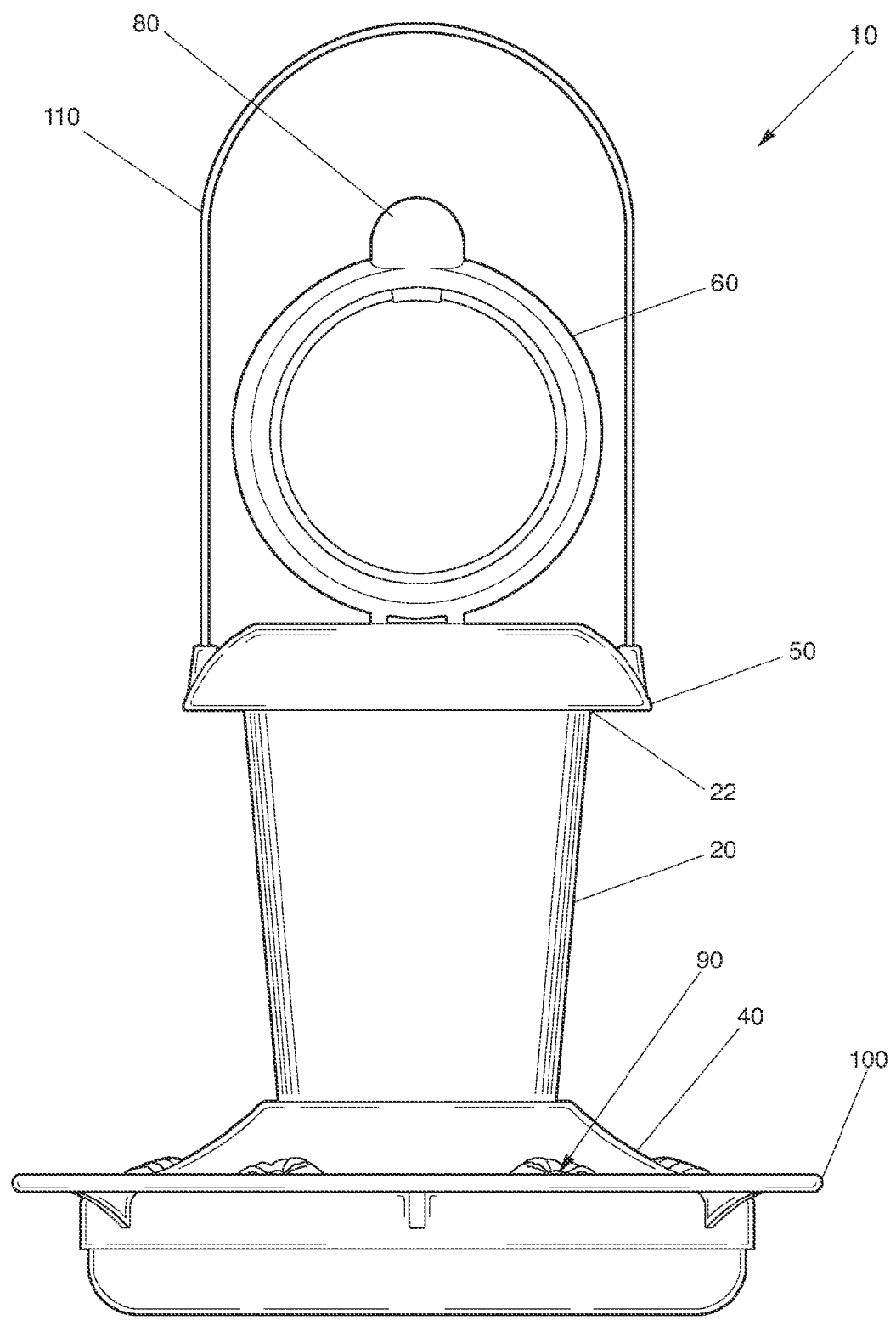
FIG. 3 is a perspective view of the bird feeder of FIG. 1 with the lid in an open position.

Referring to FIG. 3, the top end 22 of the container 20 has a cap 50 which is attached to the top end 22 of the container 20. In one embodiment, the cap 50 is threadably attached to the top end 22 of the container 20. The top end 22 of the container 20 is open and has at least one thread 21 positioned on an inner surface of the top end 22. The cap 50 is easily removed to allow full access to the interior of the container 20 for cleaning. It should be noted that other methods for attaching caps to containers may be used other than threads. For example, the cap 50 may be fixedly attached to the container 20 using adhesives or other fasteners.

A lid 60 is hingedly connected to the cap 50. The hinge 70 allows the lid 60 to be opened and closed for easier refilling of the container 20. The lid 60, when in an open position (FIG. 3), allows a user to refill the container 20 with nectar feed 160 without having to invert the container 20 or base tray 30. The lid 60, when in a closed position (FIG. 1), prevents unwanted insects and debris from gaining access to the nectar feed 160 in a reservoir 170 of the container 20. In addition, the lid 60 has a finger tab 80 to facilitate manipulation of the lid 60 from an open position (FIG. 3) to a closed position (FIG. 1).

Figure 4:
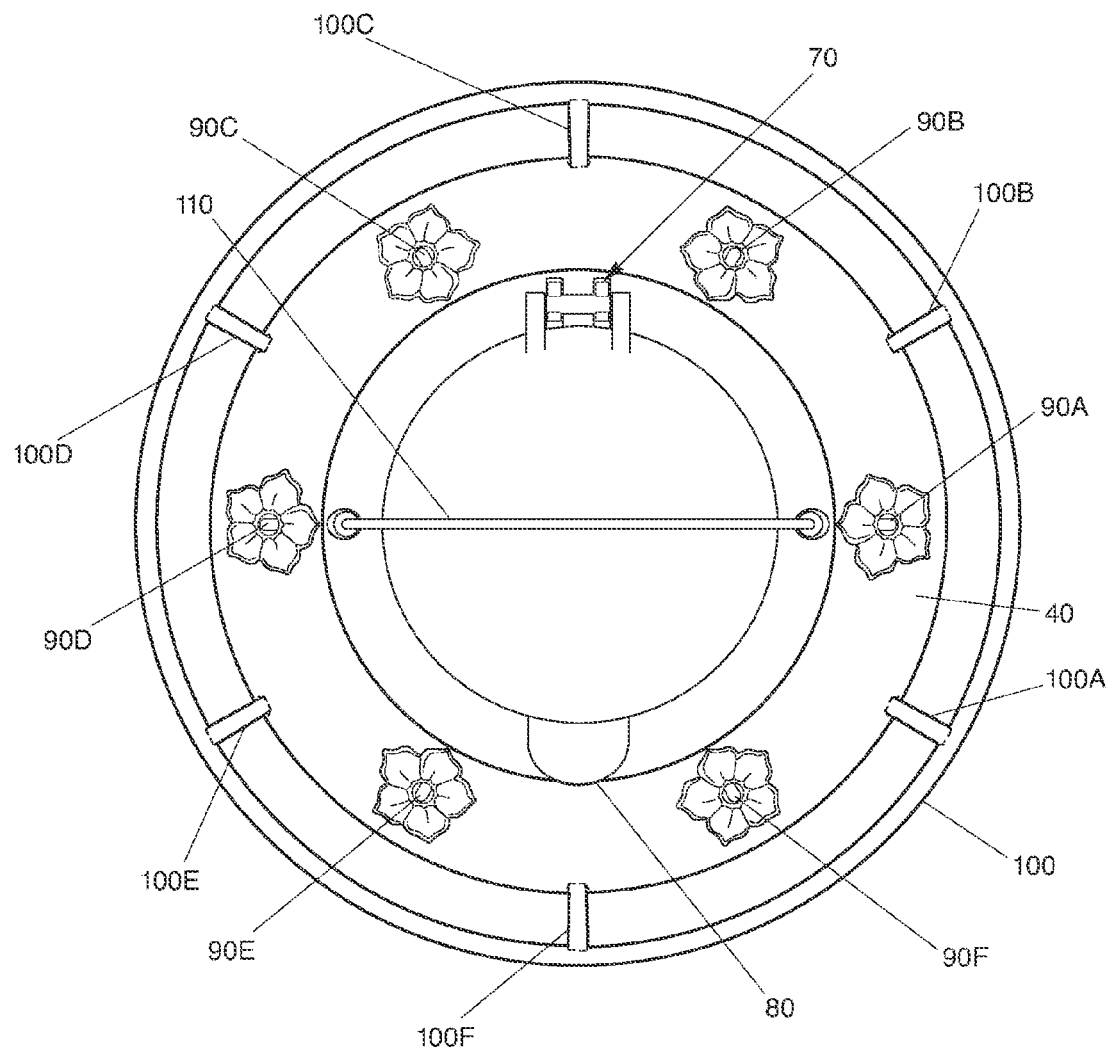
FIG. 4 is a top view of the bird feeder of FIG. 1.

Referring to FIG. 4, the base cover 40 has a support 100 or perch extending from an upper surface of the base cover 40. The raised support 100, in one embodiment, is a raised peripheral support 100 attached by six support arms (100A-100F) to the base cover 40. It should be noted that the raised support 100 may extend from various portions of the base cover 40 besides the periphery. The support 100 allows birds to rest while feeding on nectar feed 160 through a feed port (90A-90F).

The base cover 40, as mentioned above, also contains at least one feed port 90A-90F which are defined through the base cover 40. The feed ports 90A-90F are respectively positioned over the nectar 160 so that feeding birds are aligned thereover for optimum access to the nectar 160 therein. It is contemplated that the feed ports 90A-90F may be positioned anywhere on the base cover 40 so long as the float 120 does not prevent access to the nectar feed 160 within base tray 30. The feed ports 90A-90F are preferably configured to appear as flowers, or other structures, to further attract birds to the feeder 10. The feed ports 90A-90F are respectively positioned above the base tray 30 so that feeding birds are aligned thereover for optimum access to the nectar feed 160 therein.

Figure 5:
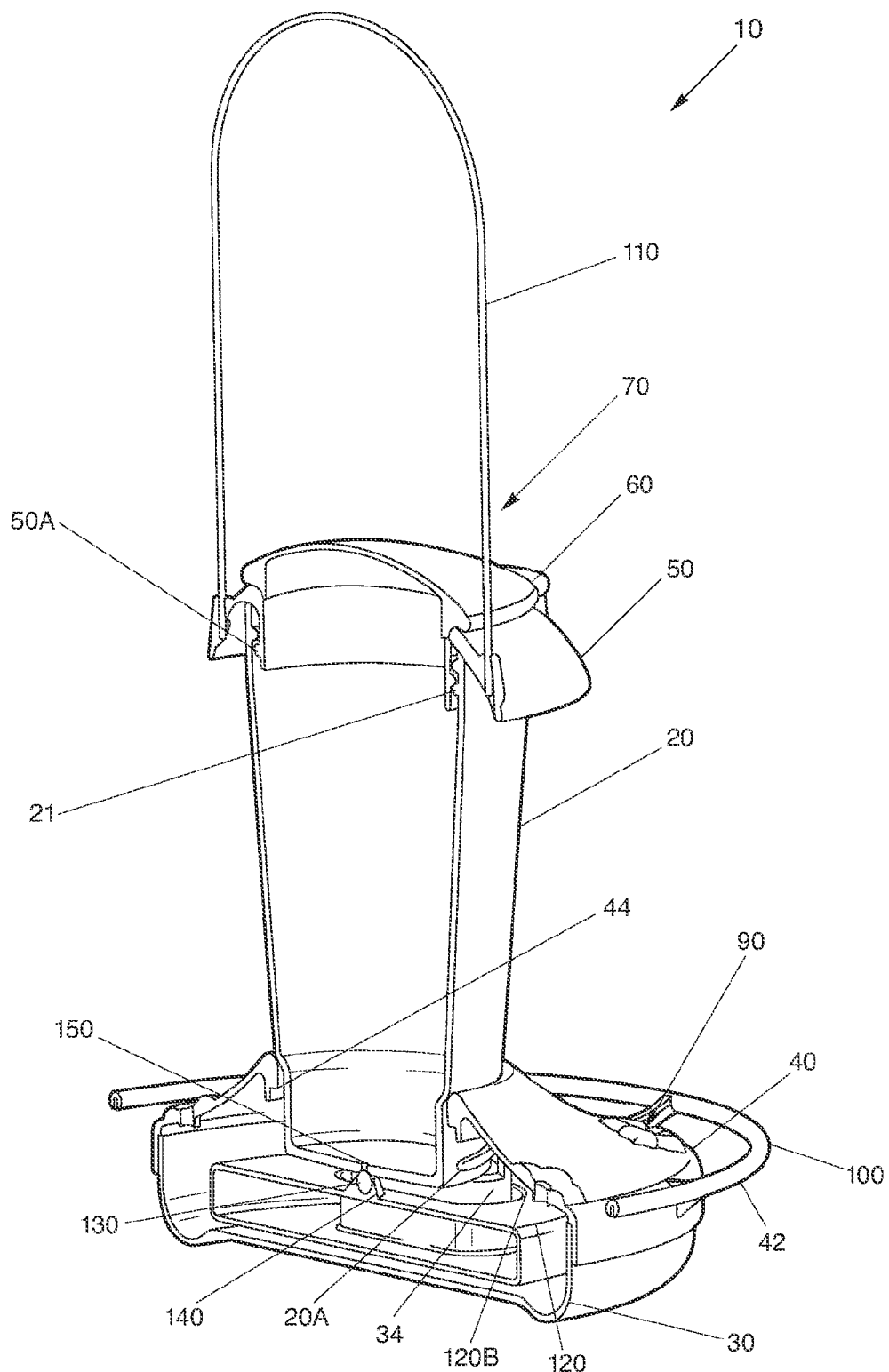
FIG. 5 is a cross-sectional view of the bird feeder of FIG. 1 cut along line 3-3.

Referring to FIG. 5, a base cover 40 is attached to the container 20. The base cover 40 defines a base cover hole 44 for receiving the lower periphery 25 of the container 20. An inner periphery of the base cover hole 44 forms at least one thread 40A, preferably partial thread, for threadably engaging at least one thread 20A, preferably partial thread, on the lower periphery 26 of the container 20. It should be noted that other methods for attaching the base cover 40 to the container 20 may be used other than threads. For example, the base cover 40 may be fixedly attached to the container 20 using adhesives or other fasteners known in the art.

Figure 6:
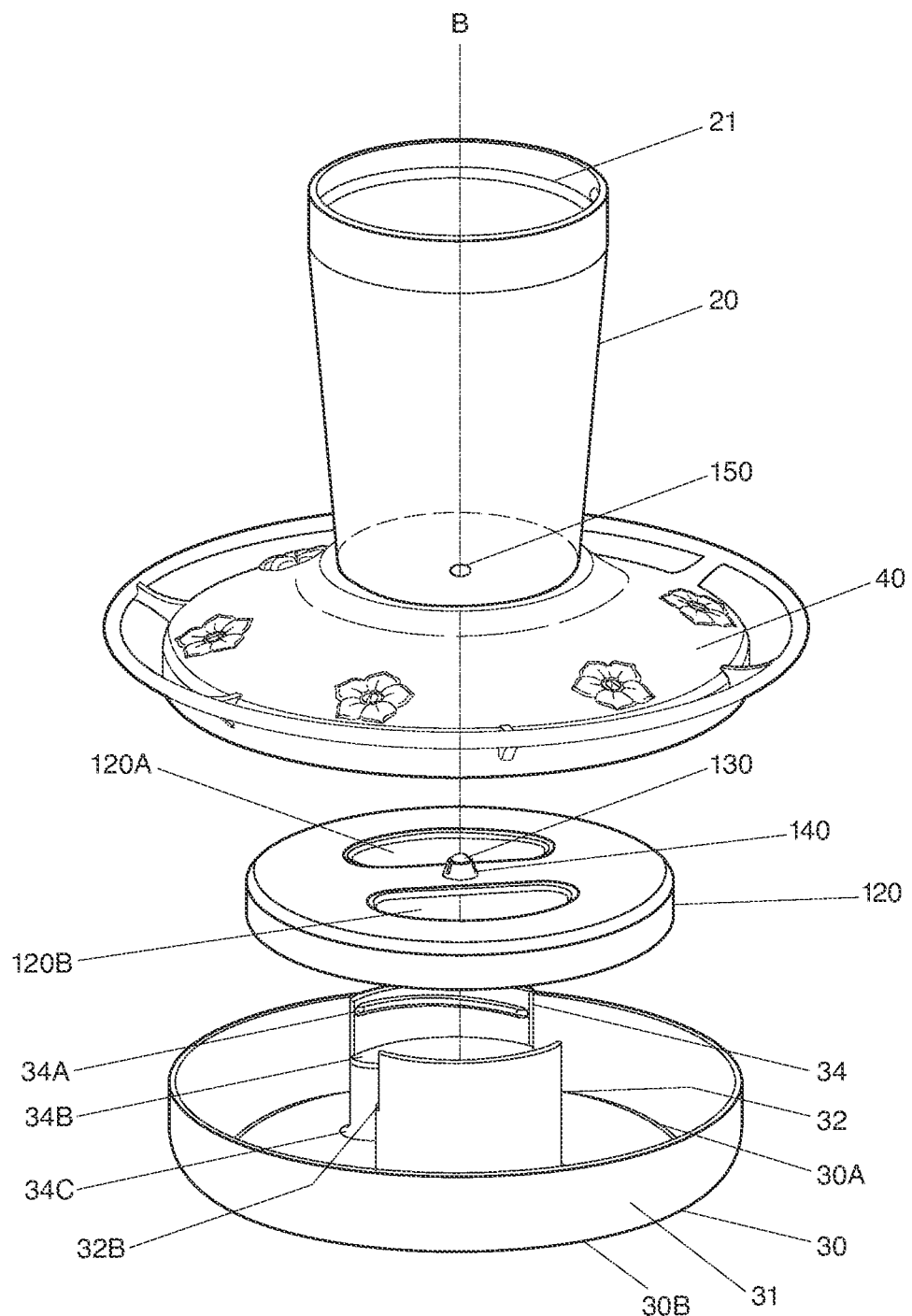
FIG. 6 is a partial front view of a bird feeder of FIG. 1.

Referring to FIG. 6, a base tray 30 has a top surface 30A and a bottom surface 30B. The top surface 30A has a wall 31 raised along a periphery of the top surface 30A of the base tray 30. The wall 31 has sufficient height to contain the nectar feed 160 therein. In a preferred embodiment, the width of the base tray 30 is greater than the height of the base tray 30.

The base tray 30 contains at least one vertical member 32, 34 extending from the top surface 30A of the base tray 30. The vertical members 32, 34 have a top 32A, 34A, middle 32B, 34B, and a bottom portion 32C, 34C. The bottom portion 32C, 34C is attached to a top surface 30A of the base tray 30. In a preferred embodiment, the base tray 30 contains two vertical members 32, 34 which are mirror images of one another. However, more than two vertical members may be used. It is contemplated that the vertical members 32, 34 may be integrally formed within the base tray 30 or may be attached by means known in the art.

Figure 7:
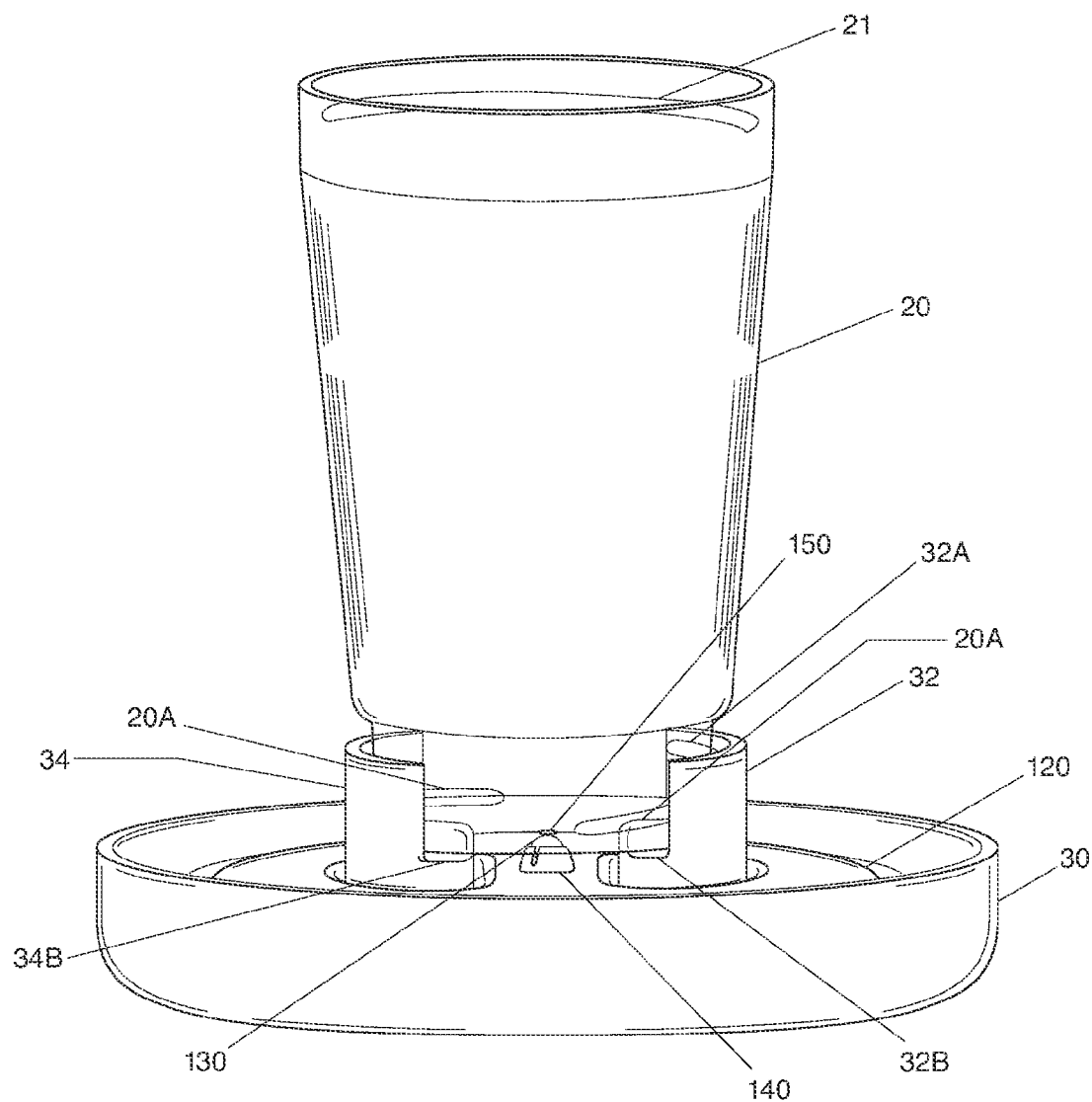
FIG. 7 is a partial side view of the bird feeder of FIG. 1.

Referring to FIGS. 6 and 7, the container 20 has an upper periphery 25 and a lower periphery 26 with at least one thread (20A) on an outside surface of the lower periphery 26. In a preferred embodiment, the lower periphery 26 has one thread 20A on the outside surface of the container 20 for threadably engaging with at least one thread (34A, 32A) on the base tray 30 and at least one thread 40A on an inner periphery of the base cover 40 respectively. In addition, the threads (34A, 32A) on the base tray 30 and the thread 40A on the base cover 40 allows for easy removability and makes it easier cleaning or replacement of worn components of the nectar feeder 10. Cleaning the components of the nectar feeder 10 is essential to preventing any contamination of the nectar feed 160 which may become harmful to birds if not maintained properly.

The middle portion 32B, 34B of the vertical members 32, 34 defines a seat for receiving a portion of the bottom end 24 of the container 20. The vertical members 32, 34 may be configured to receive less than the total surface area of the bottom end 24. For example, a first vertical member 32 may provide a seat for less than 180 degrees of the circumference of the bottom end 24 of the container 20. A second vertical member 34, which is a mirror image of the first vertical member 32, may also provide a seat for less than 180 degrees of the circumference of the bottom end 24 of the container 20. When the bottom end 24 of the container 20 rests within the middle portions 32B, 34B of the vertical members 32, 34, it provides sufficient support to hold the container 20 in a vertical position. The benefit of holding the container 20 in a vertical position is that it prevents the spillage of nectar feed.

The vertical members 32, 34 also have a top portion 32A, 34A for threadably engaging the thread 20B located on the lower periphery 25 of the container 20. In a preferred embodiment, two vertical members 32, 34 have a partial thread located on an inner surface of the top portion 32A, 34A to cooperate together to provide a female threading. The two vertical members 32, 34 threadably attaching to at least one thread 20B located on the lower periphery 25 of the container 20. It should be noted that the container 20 may be attached to the vertical members 32, 34 by structures or mechanisms other than threads. For example, the container 20 may be fixedly attached to the vertical members 32, 34 using adhesives or fasteners although this is not preferred.

A float 120 is positioned between the bottom end 25 of container 20 and the base tray 30. The float 120 defines a circular shape with an outer circumference suitable for resting within the base tray 30. The float 120 is constructed and made of material that provides buoyancy in the presence of nectar feed 160. The float 120 is preferably made of plastic material which is easy to clean. It can be a sealed hollow member with air trapped therein.

Most importantly, the float 120 is sized to permit a bird to retrieve nectar feed 160 through the feed ports 90A-90F without interference from the float 120. The float 120 is respectively positioned below the base cover 40 which has feed ports 90A-90F defined therethrough. When the bird retrieves nectar feed 160 through the feed ports 90A-90F, there must not be any obstruction from blocking access to the nectar feed 160. If the feeder ports 90A-90F are positioned proximal the peripheral raised support 100, the float 120 should have at least have a diameter less than the base tray 30. The diameter of the float 120 should also accommodate the feed ports 90A-90F to prevent any interference by the float 120 with the bird feeding on the nectar 160 through the feed ports 90A-90F. Alternative configurations of feed ports 90A-90F may necessitate additional shapes or changes in the float 120 to accommodate the direct access of the nectar feed 160 to the birds.

The float 120 defines at least one float hole 120A, 120B through the float 120 for slidably engaging the vertical member 32, 34. In a preferred embodiment, there are two float holes 120A, 120B with a "half moon shape". The float holes 120A, 120B are keyed to an outer profile or shape of the vertical members 32, 34 to prevent independent rotation of the float 120 in any direction. Of course, the float holes 120A, 120B may be adjusted to define a shape similar to the overall shape and design of the vertical members 32, 34. To facilitate the slidably engagement of the float 120 with the vertical members 32, 34, the float 120 has a thickness less than the depth of the base tray 30. Also, the height of the float 120 is less than the height of the vertical members 32, 34.

The float 120 contains a ball 130 which may be incorporated together in a single structure. However, it should be noted that valves other than stoppers or plugs may be used for the present invention. The ball 130 is seated in a ball seat 140 on a central portion of the float 120. The ball seat 140 is either integrally formed or attached to the central portion of the float 120. The ball 130 rests within the ball seat 140. When the float 120 rises due to the filling of an interior of the base tray 30 with nectar feed 160, the ball 130 engages the exit port 150 to form a ball valve and prevent the flow of nectar feed 160 through the exit port 150 and into the base tray 30. As shown along vertical axis B, the ball 130 is respectively positioned below the exit port 150 on the bottom end 25 of the container 20.

The ball 130 and the exit port 150 can be adjusted according to the dimensions and quantity of each. It should be understood that various types of valves and floats may be employed and still be within the scope of the present invention. In addition, the fluid communication between the container 20 and base tray 30 may be accomplished using structures and mechanisms other than a float 120 and ball 130.

Figure 8:
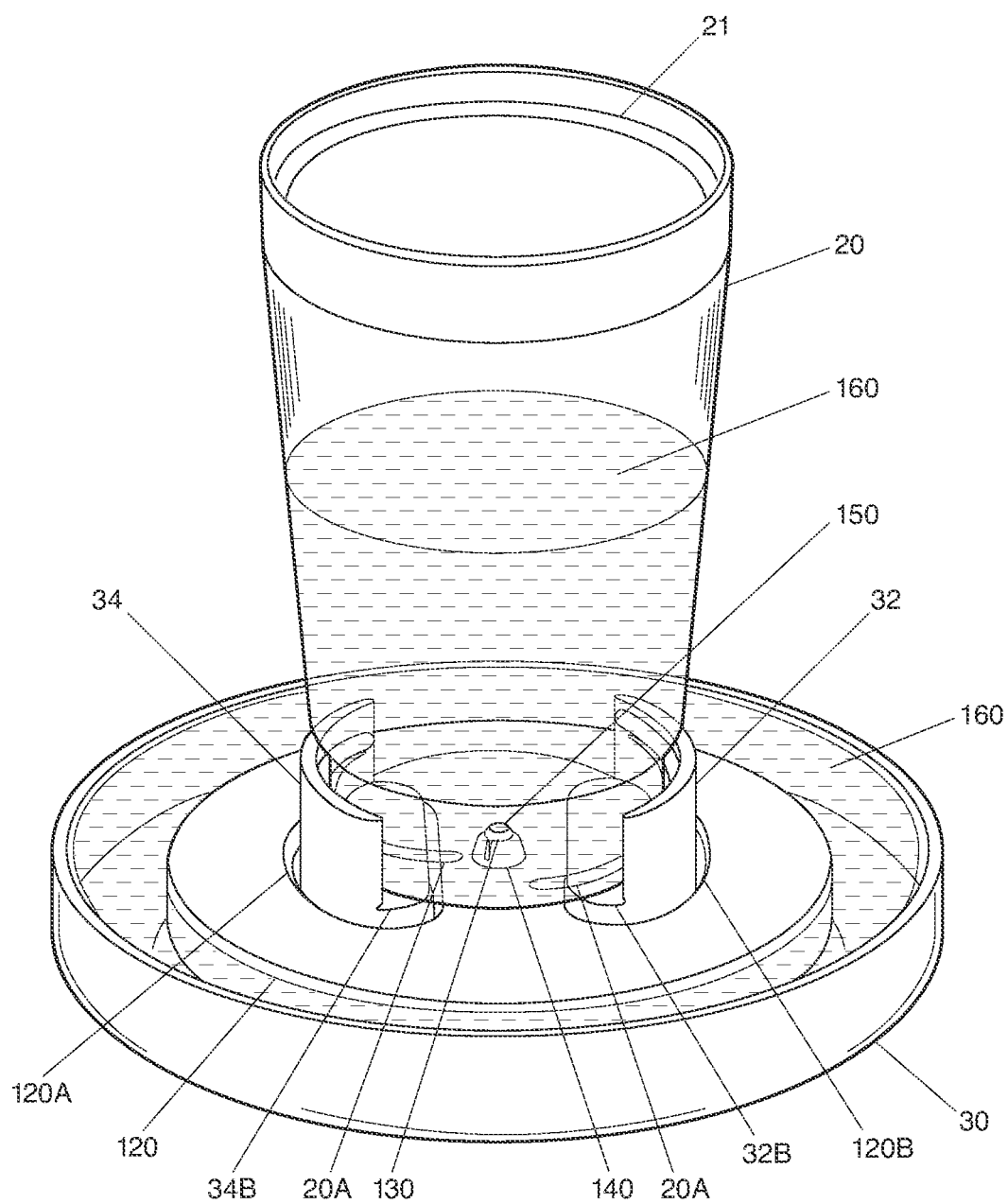
FIG. 8 is a front perspective view of the bird feeder of FIG. 1 with the float raised to prevent the flow of liquid feed into the base tray.

Referring to FIG. 8, in operation, a user opens the lid 60 (FIG. 3) and refills the container 20 with nectar feed 160. There is no need to invert the container 20 to refill which is a substantial advantage over the prior art. When the container 20 is sufficiently filled with nectar feed 160, nectar feed 160 begins to accumulate inside the container 20. When the volume of the nectar feed 160 is sufficient, the nectar feed 160 gradually begins to flow through the exit port 150 and into the base tray 30. As the base tray 30 fills with nectar feed 160, the float 120 begins to rise in correlation to the volume of nectar feed 160 occupying the interior of the base tray 30. When the base tray 30 fills with nectar feed 160, the float 120 gradually rises thus forcing the ball 130 to sealingly engage the exit port 150 located on the bottom end 25 of the container 20. When the base tray 30 is substantially full, the float 120 will further rise to sealingly engage the ball 130 within the exit port 150 which prevents the flow of nectar feed 160 through the exit port 150.

When the exit port 150 is completely blocked by the ball 130, the nectar feed 160 is prevented from moving through the exit port 150 and into the base tray 30. As a result, leakage or overflow of the nectar feed 160, such as through the feed ports 90A-90F, is prevented. In addition, the nectar feed 160 is preserved inside the container 20 and used when necessary to refill the base tray 30. If any contamination occurs inside the base tray 30, it does not contaminate the nectar feed inside the reservoir 170 of the container 20. A user can clean the base tray 30, when it has contaminated nectar feed 160, without impacting the entire supply of nectar feed 160 inside the container 20.

Figure 9:
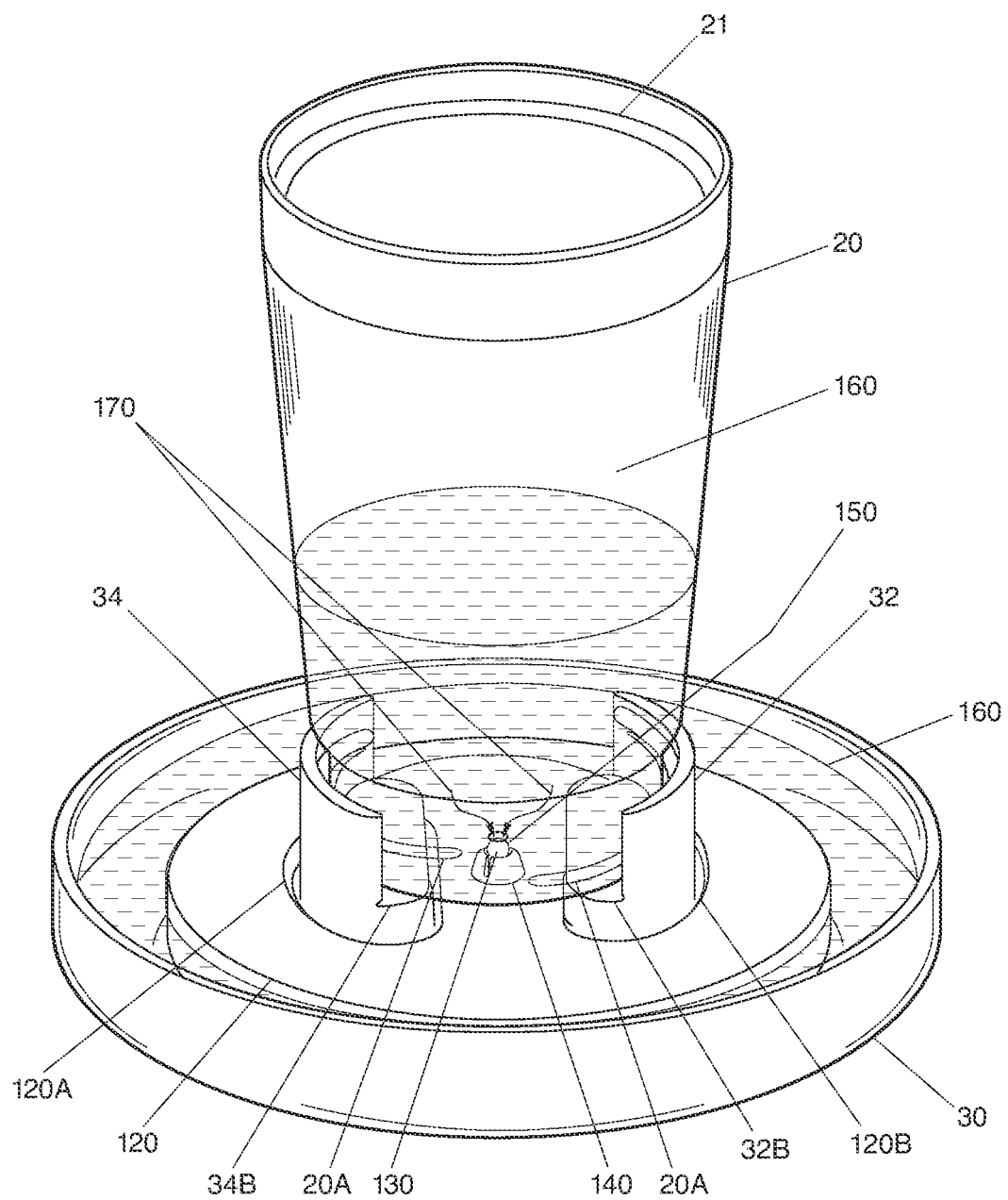
FIG. 9 is a front perspective view of the bird feeder of FIG. 1 with the float lowered to allow the flow of liquid feed into the base tray.

Referring to FIG. 9, during the normal course of use of the nectar feeder 10, the nectar feed 160 is consumed by the birds through the feeding ports 90A-90F. When the birds consume the nectar feed 160, the nectar feed level in the base tray 30 drops. As the nectar feed 160 is depleted from the base tray 30, the float 120 will eventually drop or lower thus taking upward pressure off the ball 130 to permit the entry of additional nectar feed or other liquids into the base tray 30. As a result, the float 120 disengages the ball 130 from the exit port 150 to once again allow the flow of nectar feed 160 to flow into the base tray 30. The feeder 10 permits the easy and convenient refilling of the feeder 10 even if the container 20 is not completely empty. By allowing nectar feed 160 to be flow directly from the container 20 and into the base tray 30, there is no disassembly required for eventual refilling of the base tray 30 by the container 20. This is a continual and gradual process until the nectar feed 160 is completely depleted from the container 20.

Furthermore, as seen in FIGS. 1-3, a hanger 110 is also attached to the cap 50 for securing the nectar feeder 10 to a stationary object. The hanger is an example but there are other structures or mechanisms for securing the nectar feeder 10 to another object may also be used. For example, suction cup mounts, wall mounts, and post mounts may also be used and attached to the cap 50 or other components of the nectar feeder 10.

In one embodiment, the nectar feeder 10 is made of materials known in the art. Preferably, the nectar feeder 10 is made of plastics. Various colors of the plastics may be used to attract birds to the present invention. Structures or mechanisms other than threads may be used to attach the components of the nectar feeder 10.

In view of the foregoing, a new and novel improved nectar feeder 10 is provided for easy and efficient refilling. The present invention contains a float 120 and ball 130 which regulates the flow of nectar feed 160 through the container 20 and into the base tray 30. More specifically, a container 20 is attached to the base tray 30 and in fluid communication with the base tray 30. The float 120 contains the ball 130 which is positioned between the container 20 and the base tray 30. When the nectar feed 160 flows through the container 20 and into the base tray 30, the float 120 rises until the ball 130 prevents nectar feed 160 from flowing through the container 20 and into the base tray 30. The nectar feeder 10 of the present invention can also be filled without inverting the base tray 30 or container 20 which conserves the nectar feed. In addition, the nectar feeder 10 is easier to clean than prior art nectar feeders due to the removability of various parts.

Therefore, while there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A nectar feeder, comprising:
   a container for storing nectar feed having a top end and a bottom end, an exit port defined on the bottom end thereof;
   a base tray connected in fluid communication with the container, the base tray having at least one or more vertical members depending upwardly from the base tray;
   a float is positioned between the container and the base tray, the float defining a float aperture therethrough for receipt of the at least one or more vertical members, the float engages the at least one or more vertical members to substantially reduce the rotation of the float in any direction;
   a stopper carried by the float, said stopper respectively positioned below the exit port; and
   whereby the nectar feed flows through the container and into the base tray until the float rises to a level where the stopper mechanism prevents fluid from flowing into the base tray.

2. The nectar feeder of claim 1, wherein the stopper is carried entirely and integrally formed within the float.

3. The nectar feeder of claim 2, wherein the float engages the at least one vertical members to substantially reduce independent lateral movement.

4. The nectar feeder of claim 3, wherein the float is keyed to the at least one vertical member to substantially reduce the rotation of the float in any direction and independent lateral movement of the float.

5. The nectar feeder of claim 4, wherein the bottom end of the container defines one or more threads.

6. The nectar feeder of claim 5, wherein the top end of the container is connected to a lid.

7. The nectar feeder of claim 6, further comprising:
a base cover connected to the base tray, the base cover defines at least one or more feed ports.

8. The nectar feeder of claim 7, wherein the at least one or more feed ports are defined through the base cover and respectively positioned over the nectar.

9. The nectar feeder of claim 8, wherein the areas surrounding the feed ports are configured to appear as flowers to attract birds to the feeder.

10. The nectar feeder of claim 9, further comprising:
a raised support extending from the base cover to allow birds to rest while feeding nectar feed through the feed port.

11. The nectar feeder of claim 10, further comprising:
a hanger mechanism connected to the lid for securing the nectar feeder to a stationary object.

12. A top-fill hummingbird feeder comprising:
a liquid container with a liquid flow opening at a lower end and a cap at an upper end;
a feeding basin positioned below the liquid container for containing nectar accessed by birds through at least one feeding port; and
a sealing mechanism associated with the liquid flow opening of the liquid container and the feeding basin, said sealing mechanism including a float valve which, when the float valve is in a first position, opens the liquid flow opening allowing fluid to flow from said container into said basin and, when the float valve is in a second position, closes the liquid flow opening to prevent fluid flow from said container into said basin.

13. The top-fill hummingbird feeder as set forth in claim 12, wherein said feeding basin includes a base and a removable cover.

14. The top-fill hummingbird feeder as set forth in claim 12, wherein said float has an open central area.

15. The top-fill hummingbird feeder as set forth in claim 12, wherein said float valve moves downwardly as the nectar level drops to reach said first position and upwardly as the nectar level rises to reach said second position.

16. The top-fill hummingbird feeder as set forth in claim 12, wherein said container has external threads on said lower end.

17. A top-fill hummingbird feeder comprising:
a liquid container for holding liquid hummingbird nectar with a liquid flow opening at a lower end and a cap at an upper end;
a feeding basin positioned below the liquid container for holding a quantity of said liquid hummingbird nectar received through said liquid flow opening, said basin having at least one feeding port through which birds may access said quantity of liquid hummingbird nectar in said basin;
and a sealing mechanism associated with the liquid flow opening of the liquid container and the feeding basin, said sealing mechanism having a generally vertical channel therethrough that is in fluid communication with said liquid flow opening of said container, and a float valve which, when the quantity of liquid hummingbird nectar in said basin falls below a threshold level, opens the channel to allow liquid nectar to flow from said container into said basin and, when the quantity of liquid hummingbird nectar reaches said threshold level, closes the channel to prevent liquid nectar from flowing from said container into said basin.

* * * * *